United States Patent Office 3,539,984
Patented Nov. 10, 1970

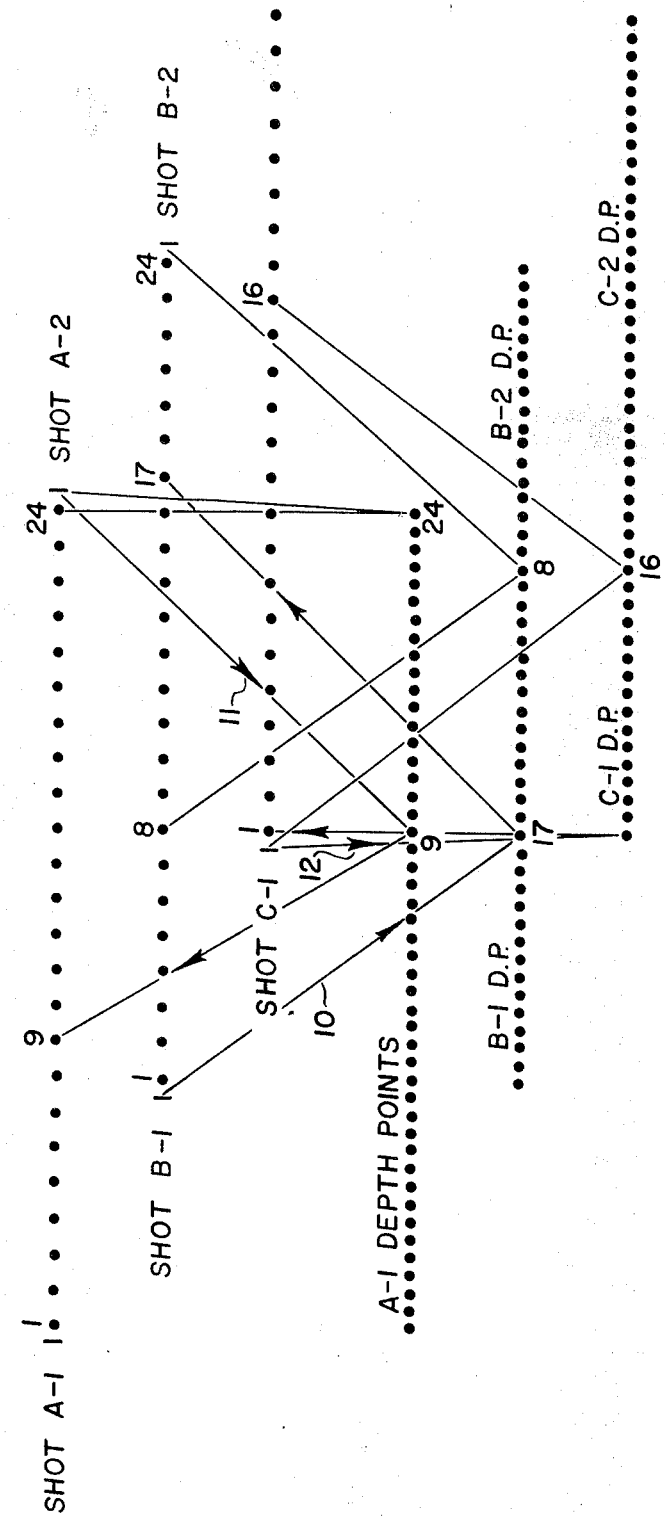

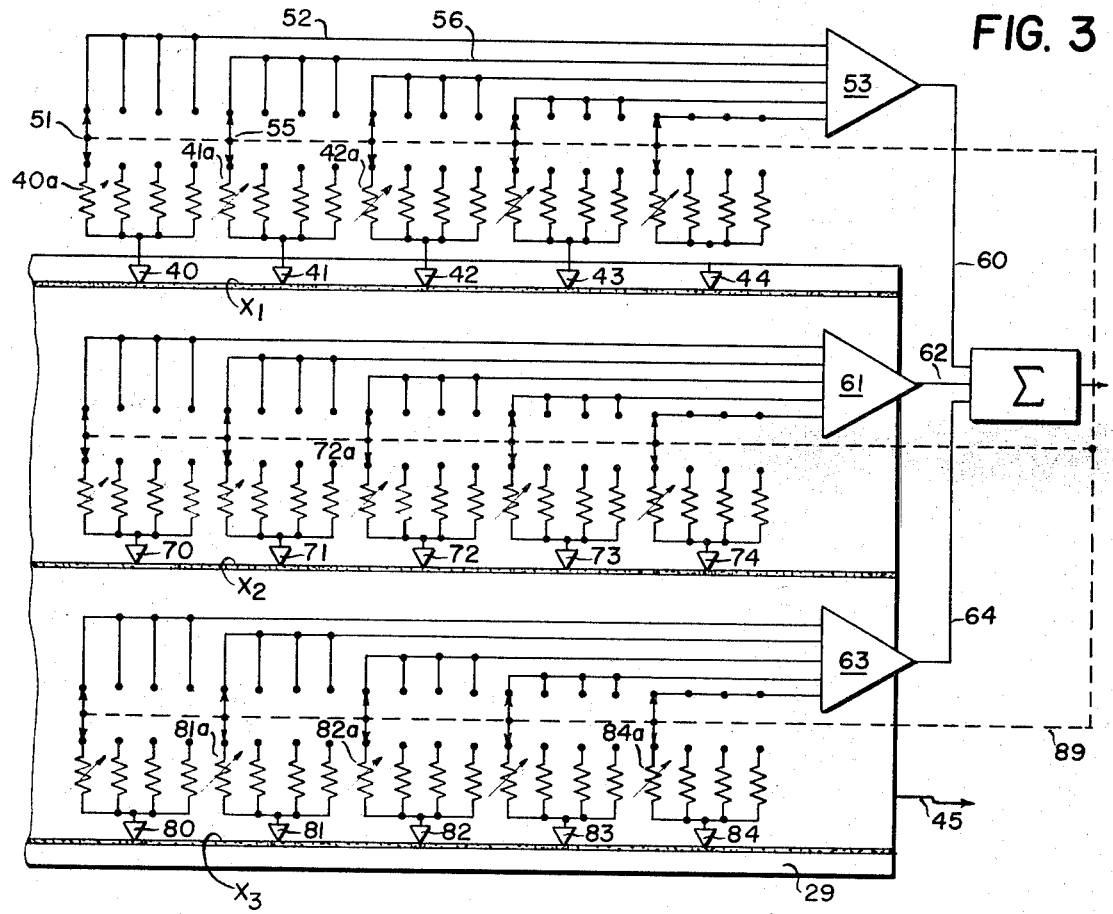
FIG. 3
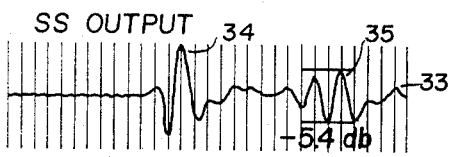
FIG. 2
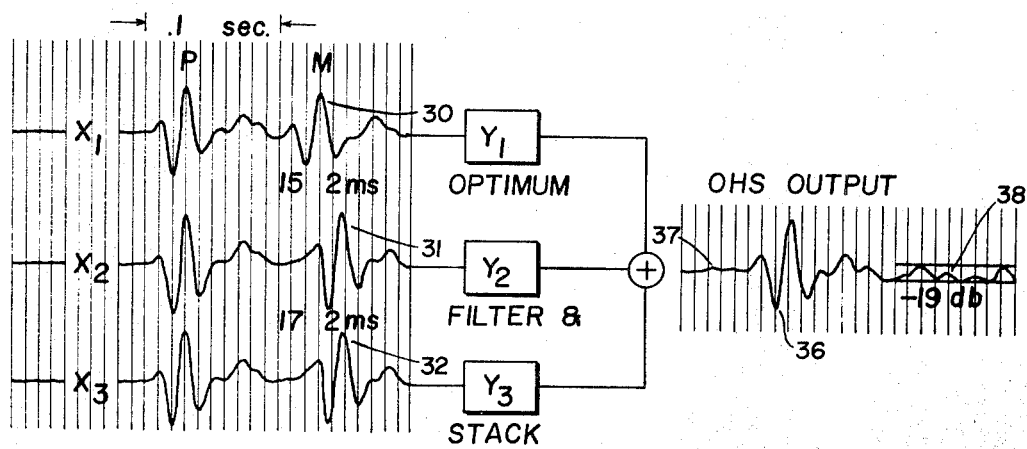

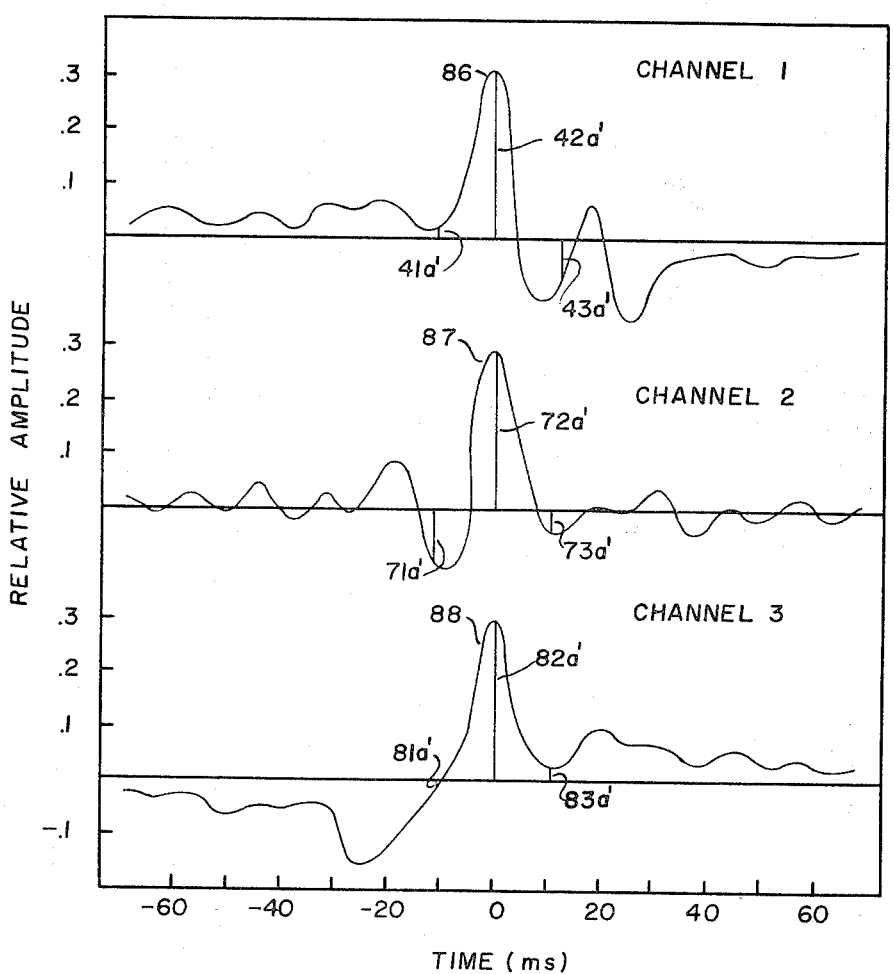
FIG. 4
FIG. 5
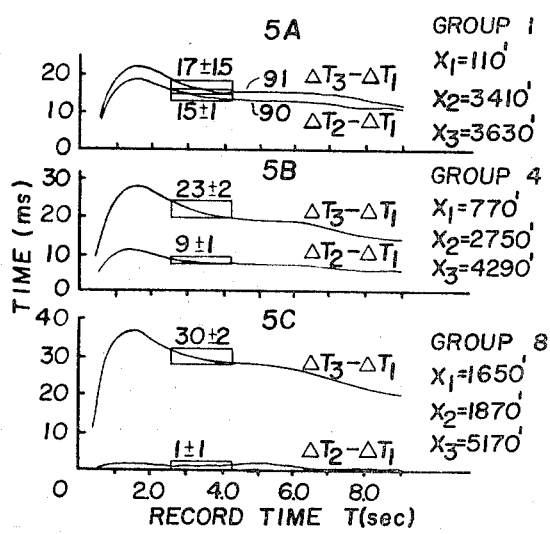
FIG. 6
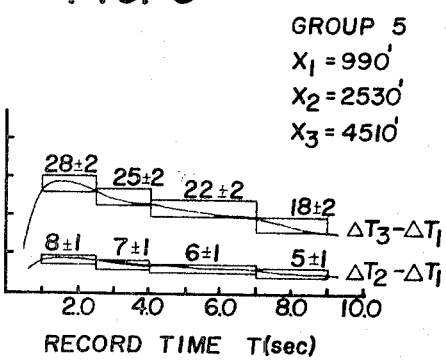

3,539,984
OPTIMUM HORIZONTAL STACKING
William Aippli Schneider, Dallas, Tex., assignor to Texas Instruments Incorporated, Dallas, Tex., a corporation of Delaware
Continuation of abandoned application Ser. No. 672,404, Oct. 2, 1967, which is a continuation of abandoned application Ser. No. 356,776, Apr. 2, 1964. This application Sept. 22, 1969, Ser. No. 860,109
Int. Cl. G01v 1/28
U.S. Cl. 340—15.5    12 Claims

ABSTRACT OF THE DISCLOSURE

Disclosed is a method of removing multiple reflection signals from common depth point seismic records wherein each signal from a given depth point is modified in accordance to the relationship of its signal path to and from the reflection point with respect to the paths of the other signals to and from the same reflection point, said modification being by the filter operator $Y_j(f)$ as defined in the matrix relationship:

$$[S_{ij}*(f) + N_{ij}*(f)][Y_j(f)] = [S_{io}*(f)]$$

Figure 7:
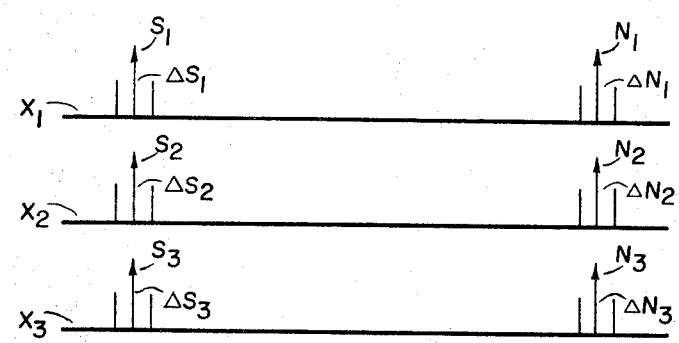

where $i = 1, 2, 3 \ldots n;$
$j = 1, 2, 3 \ldots n;$
$S_{ij}(f) =$ the cross spectral density between channels $i$ and $j$ for signal;
$N_{ij}(f) =$ the cross spectral density between channels $i$ and $j$ for noise; and
$S_{io}(f) =$ the cross spectral density between the desired output signal and the signal in channels $i = 1, 2, 3 \ldots n,$ and the modified signals are thereafter combined.

---

This application is a continuation of application Ser. No. 672,404, filed Oct. 2, 1967, now abandoned which was a continuation of application Ser. No. 356,776, filed Apr. 2, 1964, now abandoned.

This invention relates to seismic exploration and, more particularly, to multiple removal by optimum horizontal stacking of a plurality of seismic signals related to common depth points.

In geophysical prospecting, it is common practice to use an array of seismometers to detec the seismic disturbance from an explosion detonated at or below the surface of the earth. Seismometer outputs have been summed to produce a composite trace for enhancing the seismic signal containing subsurface structure information. The purpose is to give prominence to the important features of the received seismic signal and reduce or remove those undesired features which obscure the important parts of the signal. Both direct and weighted summations of seismometer array outputs have been used. Frequency filtering has been applied to the sum output according to the single channel Weiner least-mean-square-error theory. Special array geometries have been used in an attempt to enhance the seismic data.

Prior techniques, however, do not possess the capability of operating in an optimum manner. It has been found that highly useful treatment of seismic data is achieved wherein a plurality of signals related to the same reflection point on a subsurface reflector are produced. It has been found that they can be so treated as to eliminate multiple reflections.

In accordance with the invention linear frequency dependent multi-channel seismic data processing is employed to operate on signals from a seismometer array which are representative of energy from a seismic disturbance or from a seismometer receiving energy from a plurality of spatially separated shots. The signals are modified in the frequency domain prior to summation to obtain an enhanced sum output waveform. The modification may be either time variant or invariant. A linear operator, or frequency filter, is applied to each trace to apply a weighting (amplitude) and time delay factor as a function of desired seismic signal frequency to each signal in relation to the other signals from the same reflection point to obtain the desired sum output. The linear processing according to this invention is capable of operating in an optimum manner over the entire duration of the desired seismic signal to eliminate multiple reflections even though the signals have overlapping frequency. For example, desired and undesired signals having overlapping frequency with different apparent horizontal velocities are separated by use of a processor having an overall response to pass a desired signal of one apparent velocity and to suppress or reject an undesired signal of a different apparent velocity. Normal moveout corrections for lining up desired signals are applied to individual signals prior to filtering.

Accordingly, an object of this invention is improved data processing for enhancing the important components of a received seismic signal and substantially reducing or removing the undesired components of the signal which obscure the important parts.

Another object of the invention is linear processing capable of operating in an optimum manner over the entire frequency range and duration of the desired seismic signal.

Another object of the invention is linear processing with a velocity filter capable of separating different apparent velocity signals having overlapping frequency and wave number spectra.

Another object of this invention is optimum linear processing for operating on the different signals from a seismometer array output prior to summation for producing a summed output which is the best estimate in the least-mean-square-error sense of the desired seismic signal.

Another object of the invention is the optimum linear processing of different signals for separating desired and undesired signal components having different relative delays and having overlapping frequency and wave number spectra. The separation is to be effected by applying frequency dependent weights and time delay factors to said signals prior to summation, whereby said processing acts as a velocity filter to pass said desired signal and reject said undesired signal.

Another object of the invention is the optimum linear processing of different signals for separating primary and multiple reflections having different relative delays, the separation being effected by applying frequency dependent weights and time delay factors to said signals prior to summation to synthesize a velocity filter.

Figure 8:
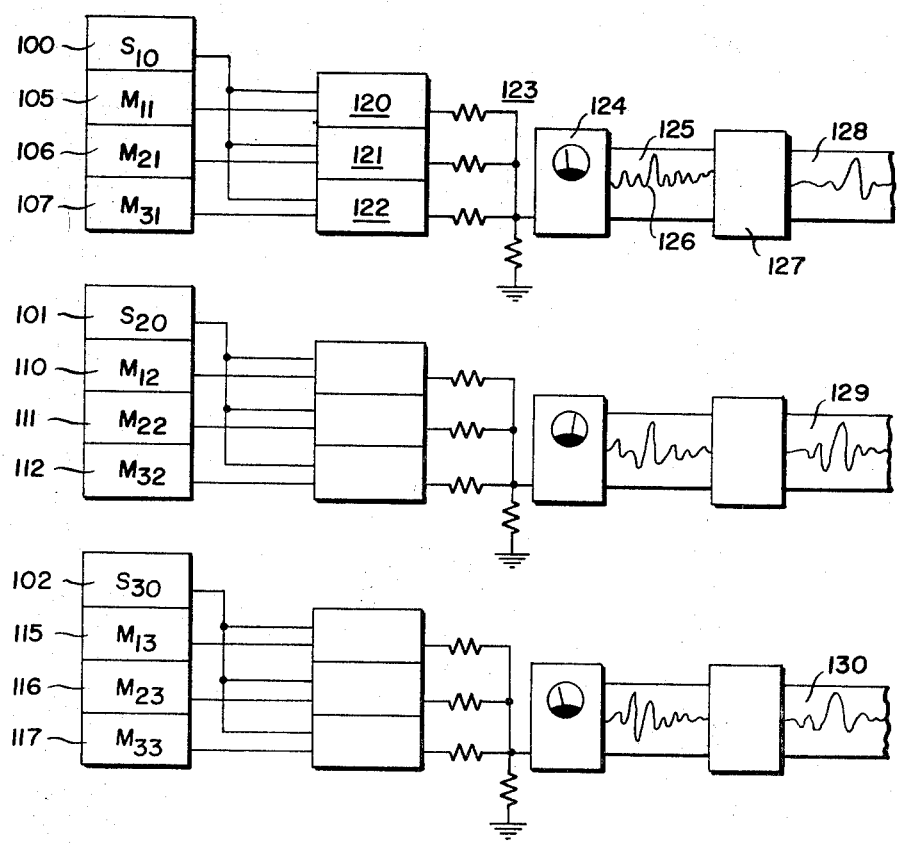

The foregoing and other objects, features and advantages of the invention will be apparent from the following detailed description taken in connection with the appended claims and attached drawings in which:

FIG. 1 illustrates a continuous reflection survey with triple subsurface coverage;
FIG. 2 illustrates multiple attenuation in accordance with the present invention;
FIG. 3 diagrammatically illustrates the filter units of FIG. 2;
FIG. 4 illustrates the impulse response of the filter of FIG. 3;
FIG. 5 illustrates moveout difference of the signal shown in FIG. 2;
FIG. 6 illustrates the selection of a plurality of time intervals for optimum filter control;
FIG. 7 is a mathematical model of the multiple reflection problem; and FIG. 8 is a system for the solution of Equation 3.

The identification and elimination of multiple reflections has been one of the most perplexing noise problems in reflection seismograph operations. Shallow multiple generators and problems attendant their presence have largely been overcome through systems currently in use. However, multiple reflections in deep sections present a different problem.

It has been found that if there is an increase in the average velocity with depth, even deep primaries and multiples may be separated on the basis of their normal moveout differences. Conventionally, this difference is exploited by shooting multiple subsurface coverage. Static and dynamic corrections are then applied. The signals reflected from common depth points with different shot-detector distances are then combined or stacked. Such a procedure is described in Geophysics, vol. XXXII, No. 6, part 2, December 1962, pp. 927–938. Because of an excess in the multiple normal moveout over the moveout of the primary energy, the multiple energy at the output of the stacking system is partially cancelled.

The present invention relates to a horizontal stack which is optimized through the use of filters peculiarly related to each seismic signal. The filters are employed prior to stacking, but in connection therewith. This results in a drastic reduction of multiple energy. It permits greater attenuation over a wide frequency band with the use of fewer detector stations. It also provides more effective utilization of the excess multiple moveout as compared with primary moveout. Finally, it preserves high frequency signal components usually lost in conventional stacking where excess subsurface coverage is necessary to achieve a similar degree of multiple reduction.

FIG. 1 illustrates one of several field procedures which may be employed when a three-channel optimum horizontal stacking procedure is to be carried out. The circles 1–24 between the shot points A–1 and A–2 represents the detector locations. Generally at each detector location a group of seismic detectors will be planted in a predetermined array. The dots represent the points of reflection at a given depth on a subsurface reflecting horizon.

In practice, a first shot is detonated at shot point A–1 which is located beyond the left end of the first spread by a distance equal to one-half the distance between spread group centers. A second shot is then fired at shot point A–2. First and second reproducible seismograms are thus obtained for shot points A–1 and A–2. Following this, one-third of the detector groups, namely detector groups 1–8, are then moved to the opposite end of the spread to form a new detector array. The new array is established as illustrated between the shot points B–1 and B–2. At this time a third shot is detonated at point B–1. Following this, a fourth shot is detonated at point B–2. The third and fourth seismograms are thus recorded. Thereafter, the detectors originally at group positions 9–16 are moved to the other end of the spread. The new array is as indicated between shot point C–1 and shot point C–2. Thereafter, shots are successively detonated at shot points C–1 and C–2. By this means, each subsurface reflecting point is covered three times. The subsurface zone treated by 300% subsurface coverage is indicated by the shaded area of FIG. 1. This procedure is continued for multiple subsurface coverage of an entire traverse of which the segments shown in FIG. 1 are but a part.

For each subsurface reflecting point, three detector output signals may be obtained from three of the above six seismograms. For example, consider the reflection point 9 in the line of A–1 depth points. This reflection point is sampled first by a shot from point A–2 traveling along ray paths 10. The reflected energy is detected at group position 9. Second, a signal including energy traveling along ray paths 11 arrives at detector location 17 following detonation of a shot at point B–1. Path 10 differs from path 11, being a slightly longer path. Third, a signal including energy traveling along path 12 is generated in response to the arrival at detector location 1 of energy from a shot detonated at shot point C–1. Path 12 is much shorter than either paths 10 or 11.

The three paths 10–12 to the common subsurface reflection point are of different lengths. Consequently for those cases where there is an increase in average velocity with depth over the section through which the seismic waves travel, there will be a difference between the normal moveout of the multiple reflections as compared with primary reflections.

Such a result is illustrated in FIG. 2 where the primary and one multiple from each of three signals are illustrated. Channel $X_1$ represents a limited time segment or gate of the signal from shot C–1. The signal on channel $X_2$ includes the signal from shot A–2 on the next longest path. The channel $X_3$ includes the signal from shot B–1, the signal from the longest traveled path.

In FIG. 2 it will be noted that the primary reflections are aligned in time. It is to be understood that this alignment ordinarily is brought about by normal moveout correction to accommodate for differences in the lengths of the travel paths of FIG. 1 over which the primary energy traveled. With the primary energy thus corrected for normal moveout, the multiple reflections 30, 31 and 32 have a residual moveout. It is this difference which permits some attenuation of the multiple energy merely by mixing the signals on channels $X_1$–$X_3$ without further treatment as in the above disclosure from Geophysics. A typical straight stacking operation is illustrated by the trace 33 of FIG. 2. The three signals of FIG. 2, were merely added. The primary reflection 34 is perfectly preserved. The attenuation of the multiple reflection by a straight three-channel stack is only about 5.4 db. To achieve more complete attenuation, it would be necessary to record 600% to 1200% subsurface coverage.

In accordance with the present invention, filters $Y_1$, $Y_2$, and $Y_3$ are included in the channel leading to the summing unit. Thus the filters operate on the signal before the signals are stacked. As indicated, the primary reflection 36 on the output trace 37 appears in perfect preservation. The energy of the multiple 38 is down about 19 db.

FIG. 3 illustrates one embodiment of the filtering system shown in FIG. 2. In this embodiment it will be understood that the three channels $X_1$–$X_3$ are on a magnetic medium 29. A plurality of pickup heads 40–44 are positioned along the channel $X_1$ at predetermined intervals. For seismic operations in the frequency range of up to 300 or 400 cycles per second, the spacing may be of the order of two milliseconds. The magnetic medium on which channels $X_1$–$X_3$ are recorded is moved past the recording heads 40–44 in the direction of arrow 45.

The time-spaced representations of the signal appear at the outputs of the detectors 40–44. Detector 40 is connected by way of a resistor 40a to the armature of a switch 51 which in turn is connected by way of channel 52 to a summing amplifier 53. In a similar manner, the detector 41 is connected by way of resistor 41a, switch 55 and channel 56 to a second input of amplifier 53. Similarly, the detectors 42–44 are connected to the amplifier 53. The values of the resistors 40a–44a, etc. are made dependent upon the multiple velocity function, and the record time. Detectors 70–74 are operative to detect signals on channel $X_2$ as a time domain filter operation. Similarly detectors 80–84 are operable to detect signals on channel $X_3$.

The system thus far described is a representation of three time domain filters, $Y_1$, $Y_2$, and $Y_3$. For a given time gate from the record, the values of resistors 40a–84a, etc. will be such that the multiple energy on the signal on the three channels will be so treated as to time and amplitude on the output line 60 that the multiple energy will be eliminated when mixed with signal energy on the output line 62 from amplifier 61 and with the signal energy on line 64 from amplifier 63. Lines 60, 62 and 64 are connected to the inputs of a summing unit 65 so that the signal on output line 66 is the signal represented by trace 37 of FIG. 2.

While the number of pickup units 40–44 illustrated in FIG. 3 is limited to five for each of the channels, it will be understood that a time domain filter ordinarily may require a greater number.

It is now necessary to adjust the filters of FIG. 3 and particularly the values of the resistors 40a–84a in the three filters to proper values in order to duplicate or approximate the impulse responses shown in FIG. 4. The values of the resistors are determined by utilizing acoustic velocity data for the particular formations through which the ray paths 10–12 extend or through formations of the same geologic section.

Where a well is available velocity data can be obtained from a continuous velocity log of the section through which the seismic waves pass. Such information may be obtained generally in the manner disclosed in U.S. Pat. 2,704,364.

The multiple velocity function may also be obtained where a borehole is not available for logging purposes by shooting an expanding spread program as described in Geophysics, vol. XXVII, No. 6, part II, December 1962, p. 981 et seq. Both the primary and multiple velocity profiles may be obtained in accordance with this technique. The velocity information is then used in order to provide information for establishing the values of the resistors so that the time domain filters of FIG. 3 will have the desired response.

For the specific cases illustrated in FIGS. 1 and 2, the impulse responses for the three time domain filters of FIG. 3 are illustrated in FIG. 4. The impulse response for the filter on channel $X_1$ is shown by the curve 86. Similarly the curves 87 and 88 represent the impulse response for the filters on channels $X_2$ and $X_3$ respectively.

From either a velocity log or from expanding spread section strong reflectors at substantial depths which cause multiple can readily be identified. From the geometry of such reflectors and with the knowledge of the section above the reflectors there can be computed or plotted, for each shot-detector spacing, data of the character illustrated in FIG. 5. The plot 5A includes data also represented in FIG. 2. More particularly, curve 90 represents the difference between the time spacing of primary reflections and the multiples on channel $X_1$ of FIG. 2 and the time spacing of primaries and multiples on channel $X_2$ of FIG. 2. The primary and the multiples plotted in FIG. 2 are those which were found in one set of field records at a record time of about three seconds.

The difference between the arrival time of multiples 30 and 31, channels $X_1$ and $X_2$, is about fifteen milliseconds. The difference between the arrival time of multiples 30 and 32 on channels $X_1$ and $X_3$ is about seventeen milliseconds.

Data on FIG. 5 is obtained from the velocity. The curves 90 and 91 extend from early record time to late record time. Data as to the multiple arrivals for any particular groups having ray paths 10–12 is shown in FIG. 1. The ray path 12 for the channel $X_1$ has a separation between the shot and detector group of 110' as illustrated in connection with plot 5A. The separation between the shot A–2 and the group location 9 is much longer, being 3410'. Similarly, the shot-detector group separation for shot B–1 and group location 17 is 3630'.

Plot 5B shows data for group 4 where the shot-detector group locations are spaced 770', 2750' and 4290' respectively.

Plot 5C shows the shot-detector group spacings for group 8 in which the shot-detector group locations are spaced 1650', 1870', and 5170' respectively. The foregoing description has dealt primarily with group 1 for which the data is plotted in plot 5A. The following description will be limited to group 1 with the understanding that similar treatment will be applied for each of the other seven groups. It will be readily recognized that for the procedure shown in FIG. 1 involving 24 detector groups with 300% subsurface coverage, there will be eight separate groups of three traces per group. The eight groups repeat themselves as the spread locations and shot point locations are moved along the seismic traverse.

In order to understand the design of the filters it will be helpful at this point to consider the mathematical model for signal and noise pertinent to the multiple reflection problem as shown in the diagram of FIG. 7. In FIG. 7 $X_1$, $X_2$, and $X_3$ again represent the three traces having common subsurface in one of the stack groups. $S_1$, $S_2$, and $S_3$ represent the relative arrival times of signal (primary) on the three channels, and $\Delta S_i$, $i=1, 2, 3$ are the ranges of relative arrival times that signal (primary) may have due to static errors, normal moveout errors, etc. $N_1$, $N_2$ and $N_3$ represent the relative arrival times of coherent noise (multiple) on the channels, and $\Delta N_i$, $i=1, 2, 3$, are the ranges of relative arrival times that noise may have due to the change of multiple normal moveout with record time, static errors, etc. It is understood that these two types of arrivals (primary and multiple) may occur anywhere on the record any number of times independent of one another.

The three filter characteristics as a function of time $Y_1(t)$, $Y_2(t)$, and $Y_3(t)$, respectively corresponding to their characteristics as a function of frequency $Y_1(f)$, $Y_2(f)$, and $Y_3(f)$ are physically embodied in analog form in FIG. 3 satisfy the least-mean-square-error criteria according to the matrix equation:

$$[S_{ij}*(f)+N_{ij}*(f)][Y_j(f)]=[S_{io}*(f)] \quad (1)$$
$$i=1, 2, 3 \ldots n$$
$$j=1, 2, 3 \ldots n$$

The matrix elements $S_{ij}(f)$ and $N_{ij}(f)$ of Equation 1 are the cross spectral densities or cross power spectra between channels $i$ and $j$ for signal and noise respectively. The elements of the right hand column vector $S_{io}(f)$ are the cross spectral densities between the desired output signal and the signal in channels $i=1, 2 \ldots n$ respectively, assuming no correlation between signal and noise.

Equation 1 may be rewritten in the following form:

$$(2) \quad \begin{bmatrix} [S_{11}(f)+N_{11}(f)][S_{12}*(f)+N_{12}*(f)][S_{13}*(f)+N_{13}*(f)] \\ [S_{21}*(f)+N_{21}*(f)][S_{22}(f)+N_{22}(f)][S_{23}*(f)+N_{23}*(f)] \\ [S_{31}*(f)+N_{31}*(f)][S_{32}*(f)+N_{32}*(f)][S_{33}(f)+N_{33}(f)] \end{bmatrix} \begin{bmatrix} Y_1(f) \\ Y_2(f) \\ Y_3(f) \end{bmatrix} = \begin{bmatrix} S_{10}(f) \\ S_{20}(f) \\ S_{30}(f) \end{bmatrix}$$

The terms along the main diagonal in Equation 2 are auto-power spectra as $i=j$.

The desired primary and undesired multiple signals to be evaluated by Equations 1 and 2 may be the signal $S(t)$ [desired] and noise $N(t)$ [undesired] where $N(t)=C(t)+R(t)$ $C(t)$=multiple reflection $M(t)$ $R(t)$=random noise $n(t)$ The signal and noise models to be evaluated by Equations 1 and 2 are two signals distinguished by their different relative delays on the three channels.

Equation 2 may be inverted to the following form by any one of several well-known techniques, of which the Crout reduction technique is exemplary. By this means the unknown quantities $Y_1$, $Y_2$ and $Y_3$ may be evaluated for each frequency of interest.

$$\begin{bmatrix} Y_1(f) \\ Y_2(f) \\ Y_3(f) \end{bmatrix} = \begin{bmatrix} M_{11}(f) & M_{12}(f) & M_{13}(f) \\ M_{21}(f) & M_{22}(f) & M_{23}(f) \\ M_{31}(f) & M_{32}(f) & M_{33}(f) \end{bmatrix} \begin{bmatrix} S_{10}(f) \\ S_{20}(f) \\ S_{30}(f) \end{bmatrix} \quad (3)$$

where $M_{11}(f)$ etc. are the elements resulting from inversion of the first member of Equation 2.

The matrix elements in Equation 2 may be determined on a theoretical basis under the following assumptions.

(1) The signal and noise are uncorrelated with each other on a given channel and between channels.

(2) The signal waveform is assumed to be the same on all channels except for arrival times.

The signal may be modeled in terms of its space correlation properties. The auto-correlation function of signal $$\rho_{kk}{}^s(\tau)$$

is assumed identical for all channels. The cross-correlation between signals on channels $i$ and $j$ is given by:

$$\rho_{ij}{}^s(\tau) = \frac{1}{2T} \int_{-T}^{T} S_i(t) S_j(t-\tau) dt = \rho_{kk}{}^s(\tau + \alpha_j - \alpha_i) \quad (4)$$

where $\alpha_i$ = relative delay time of signal on channel $i$
$\alpha_j$ = relative delay time of signal on channel $j$.

The parameters $\alpha_i$ and $\alpha_j$ represent the moveout that desired signal may have between channels $i$ and $j$. They are in practice subject to errors resulting from poor statics, incorrect normal moveout, etc., and they may be expected to vary over some range. The $\alpha_i$'s may be treated as random variables with uniform probability over some range in computing the average correlations:

$$\langle \rho_{ij}{}^s(\tau) \rangle = \int_{S_i - \Delta S_i}^{S_i + \Delta S_i} d\alpha_i \int_{S_j - \Delta S_j}^{S_j + \Delta S_j} d\alpha_j p(\alpha_i \alpha_j) \rho_{kk}{}^s(\tau + \alpha_j - \alpha_i) \quad (5)$$

where $p(\alpha_i \alpha_j)$ is the joint probability distribution function. The assumption is made that static errors etc., are statistically independent between channels hence $$p(\alpha_i \alpha_j) = p(\alpha_i) p(\alpha_j)$$

and that the distribution is uniform $$p(\alpha_i) p(\alpha_j) = \frac{1}{2\Delta S_i} \cdot \frac{1}{2\Delta S_j}$$

The range of moveout between channels $i$ and $j$ for signal is $(S_i \pm \Delta S_i) - (S_j \pm \Delta S_j)$.

The average in Equation 2 may also be written as a double convolution $$\rho_{kk}^s(\tau)$$

with two "box car" functions $$\langle \rho_{ij}^s(\tau) \rangle = \frac{[\rho_{kk}^s(\tau) \circledast h_i(\tau - S_i)] \circledast h_j(\tau + S_j)}{4 \Delta S_i \Delta S_j} \quad (6)$$

where $\circledast$ = convolution and $$h_k(\tau) = \frac{\boxed{\phantom{XXX}}^{\sim 1}}{-\Delta S_k \quad 0 \quad \Delta S_k} \xrightarrow{\tau}$$

The signal auto and cross power terms may be obtained from Equation 6 by Fourier transform $$S_{ij}^*(f) = \int_{-\infty}^{\infty} \langle \rho_{ij}^s(\tau) \rangle e^{i2\pi f \tau} d\tau \quad (7)$$

$$S_{ij}^*(f) = \phi_s(f) \frac{\sin 2\pi f \Delta S_i}{2\pi f \Delta S_i} \frac{\sin 2\pi f \Delta S_j}{2\pi f \Delta S_j} e^{i2\pi f (S_i - S_j)} \quad (8)$$

for $i \neq j$ and $\phi(f)$ is the Fourier transform of $$\rho_{kk}{}^s(\tau)$$

$S_{ii}^*(f) = \phi_s(f)$ [let $\alpha_j = \alpha_i$ in Equation 2] for $i = j$.

For the model illustrated in FIG. 7, each of the auto power functions $S_{ij}^*(f)$ may be considered to be a constant. More particularly $S_1$, $S_2$ and $S_3$ of FIG. 7 are in time alignment so that the exponential term of Equation 8 is unity. All of the remainder of the terms on the right-hand side of Equation 8 are constants. However, special consideration must be given to the terms $\Delta S_i$ and $\Delta S_j$. These terms may also be considered to be constant and of the magnitude illustrated in FIG. 7. Thus, each of the auto power functions of the signal as required by Equation 2 will be constant for a given frequency.

By similar analysis, the matrix elements for coherent noise are:

$$N_{ij}^*(f) = (\phi_c f) \frac{\sin 2\pi f \Delta N_i}{2\pi f \Delta N_i} \frac{\sin 2\pi f \Delta N_j}{2\pi f \Delta N_j} e^{i2\pi f (N_i - N_j)} \quad (9)$$

for $i \neq j$ and $\phi_c(f)$ is the Fourier transform of the coherent noise auto-correlation $$\rho_{kk}{}^c(\tau)$$

In the foregoing equation, $\Delta N_i$ and $\Delta N_j$ may be considered to be the constant values or functions illustrated in FIG. 7. However, the exponential term of Equation 9 varies in dependence upon spread geometry and record time. It has the value of the time differences illustrated in FIG. 5, for example, the value at the given record time of three seconds from the curves of plot 5A, FIG. 5. The value of the parenthetical portion of the exponential $(N_1 - N_1)$ would be unity for the first element. For the second element, $(N_1 - N_2)$ would be fifteen milliseconds. For the third element, $(N_1 - N_3)$ would be seventeen milliseconds. Thus, by plugging into the Equations 8 and 9, all the data necessary for solution to Equation 2 is obtained. The data comes from the velocity functions such as plotted in FIG. 5 and from the assumed values of error illustrated in FIG. 7.

$$N_{ii}^*(f) = \phi_c(f) + \phi_R(f) \quad i = j \quad (10)$$

where $\phi_R(f)$ is the random noise power uncorrelated between channels.

Finally, the elements of the column vector on the right-hand side of matrix Equation 1 may be obtained in a similar fashion as:

$$S_{io}^*(f) = \phi_s(f) \frac{\sin 2\pi f \Delta S_i}{2\pi f \Delta S_i} \frac{\sin 2\pi f \Delta S_o}{2\pi f \Delta S_o} e^{i2\pi f (S_i - S_o)} \quad (11)$$

for $i \neq o$ where the parameter $o$ represents the reference position in the array at which the signal is to be estimated. If $o$ corresponds to one of the seismometer positions $x_o = x_i$; then that term of the column vector simply becomes, $$S_{00}^*(f) = \phi_s(f) \quad \text{for } i = o \quad (12)$$

Having generated analytic expression for the matrix elements in Equation 1, the matrix is inverted for the $Y_i$, $i = 1, 2, 3$. Since the $Y(f)$ are computed in the frequency domain they are in turn inverted to the time domain by Fourier transform to determine the impulse response of the filters as shown in FIG. 4. The impulse responses of the filters are then convolved with the common depth point traces for which they are designed, and stacked for multiple attenuation as shown in FIG. 3.

FIG. 8 illustrates one system for evaluation the impulse response of the filters $Y_1$, $Y_2$, and $Y_3$ by carrying out the operations as indicated in Equation 3.

Variable voltage sources 100, 101 and 102 provide variable unidirectional voltages which may be adjusted in magnitude in accordance with the desired values of the functions $S_{10}$, $S_{20}$, and $S_{30}$ respectively. Sources 105, 106 and 107 similarly are adjustable voltage sources which will provide voltages representative of the values $m_{11}$, $m_{21}$ and $m_{31}$ respectively, the latter being represented mathematically in Equation 3.

Sources 110, 111 and 112 are provided for representing the values $m_{12}$, $m_{22}$, $m_{32}$. Sources 115, 116 and 117 are provided to supply voltages representative of the elements $m_{13}$, $m_{23}$ and $m_{33}$.

Multipliers 120, 121 and 122 are also provided. The source 100 is connected to one input terminal of each of the multipliers 120-122. The source 105 is connected to the second input terminal of multiplier 120. The source 106 is connected to the second input terminal of multiplier 121. The source 107 is connected to the second input of multiplier 122. The outputs of the multipliers 120-122 are summed in a network 123 with the sum being applied to a meter-recorder unit 124 to produce a record 125. For each setting of the sources 100, 105, 106 and 107, one point on the curve 126 will be plotted. The point will represent the particular frequency at which the values of the Equation 3 are determined. Thus, an amplitude frequency plot is formed on record 125. This plot characterizes the filter $Y_1$. The $Y_1$ filter information is then applied to a unit 127 to provide a Fourier transform on chart 128. The function recorded on chart 128 represents the impulse response of the filter $Y_1$ at the record time selected for the data for the values to be used in the exponential of Equation 9. In a similar manner, charts 129 and 130 are produced which represent respectively the impulse response of the filter $Y_2$ and filter $Y_3$ respectively.

The impulse responses of the filters $Y_1$, $Y_2$ and $Y_3$ are illustrated in detail in FIG. 4. The impulse response as plotted in FIG. 4 is then employed to set or adjust the values of the resistors 40a–84a of the unit of FIG. 3. More particularly for channel $X_1$ at Time=0, the magnitude of the resistor 42a is made proportional to the ordinate 42a'. The value of resistor 72a is proportional to the ordinate 72a'. The value of resistor 82a is proportional to the ordinate 82a'.

Similarly, the resistor 41a is proportional to the ordinate 41a'; resistor 71a to ordinate 71a' (with provision being made though not shown for polarity reversal); resistor 81a to ordinate 81a'; resistor 43a to ordinate 43a'; resistor 73a to ordinate 73a'; and resistor 83a to ordinate 83a'. In a similar manner, each of the resistors in the filters will be adjusted to magnitudes and polarities which are dependent upon the respective impulse response curves of FIG. 4. The filters will then serve to eliminate multiples so long as the data, such as represented in the plot 5A of FIG. 5 is representative of the multiple excess moveout.

In FIG. 6 it will be noted that the curves are segmented. Consistent therewith, the filters will be changed as to their respective impulse responses as a function of record time. This may be accomplished in FIG. 3 by actuating linkage 89 at 2.5 seconds, 4 seconds, and 7 seconds record time as indicated in FIG. 6. The filter switches successively couple one set of resistors and then another in each of the filter banks. The values of the selected resistors are selected in dependence upon functions such as in FIG. 6 to provide for multiple removal in each of the record intervals.

It will be appreciated that the foregoing description of an analog type of apparatus for carrying out the invention may be substituted by a digital computer which is programmed to carry out the operation mathematically and graphically described above. The input data will comprise the seismic reflection data and the design data for the optimum filters.

It is to be understood that the invention is not limited to the specific field technique illustrated in FIG. 1. For example, it may be of the type described in the above-identified article from Geophysics dealing with expanding spreads. In such case, the expanding spread data could be rendered free from multiples. Other field procedures may also be employed where more than but single coverage of the subsurface is accomplished.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for eliminating deep section multiples which comprises:
   (a) means for successively generating seismic waves at a plurality of points spaced selected distances from a reference point,
   (b) means located at like distances from said reference point and on the side thereof opposite the respective generating means for detecting seismic waves,
   (c) a filter for each signal having a time-response characteristic dependent upon the ray paths from said shot points to said detectors and the multiple excess moveout times, and
   (d) compositing means interconnecting the outputs of said filters.

2. In seismic exploration, the method which comprises causing an automatically operable system to perform the steps of:
   (a) generating a plurality of signals representative of seismic waves detected after travel to and from the same subsurface reflecting point over a like plurality of paths all of different lengths and in which multiple reflections have an apparent velocity which differs from the apparent velocity of primary reflections in dependence upon the geometries of and velocity profiles along said paths,
   (b) modifying the time distribution of the multiple reflections in each said signal relative to the primary reflections therein in dependence upon the geometry of its path to and from said point and upon the multiple excess moveout times, and
   (c) combining the modified signals to produce a composite signal in which said primary reflections are enhanced relative to said multiple reflections.

3. The method of seismic exploration which comprises causing an automatically operable system to perform the steps of:
   (a) generating at least three electrical signals corrected for normal movement and which are representative of seismic waves detected after travel to and from the same subsurface reflecting point over three paths of different lengths in which multiple reflections have an apparent velocity which differs from the apparent velocity of primary reflections in dependence upon the velocity profiles along said paths,
   (b) generating an electrical signal from each of said signals in which the time distribution of said multiple reflections is modified in dependence upon the geometry of its path, and
   (c) combining the modified signals with the primary reflections in time coincidence to produce a composite signal in which the multiple reflected energy is disproportionately diminished.

4. The method of seismic exploration which comprises causing an automatically operable system to perform the steps of:
   (a) generating at least three signals representative of seismic waves detected after travel to and from the same sursurface reflecting point over three paths of different lengths in which multiple reflections have an apparent velocity which differs from the apparent velocity of primary reflections in dependence upon the geometries of and velocity profiles along said paths, (b) modifying the time distribution of said multiple reflections in each of said signals relative to said primary reflections therein in dependence upon the geometry of its path to and from said reflection point and upon said multiple excess moveout times, and (c) combining the modified signals with the primary reflections in time coincidence to produce a composite signal in which the multiple energy is disproportionately diminished.

5. The method set forth in claim 4 including the step of stepwise changing the modification of said time distribution of the multiple reflection as a function of the time of said plurality of electrical signals.

6. The method of seismic exploration which comprises causing an automatically operable system to perform the steps of:

(a) generating at least three signals representative of seismic waves detected after travel to and from the same subsurface reflecting point over three paths of different lengths in which multiple reflections have an apparent velocity which differs from the apparent velocity of primary reflections in dependence upon the geometries of and velocity profiles along said paths, (b) generating a signal from each of said signals in which the time distribution of said multiple reflections is modified in dependence upon the geometry of its path and upon the multiple excess moveout times, and (c) combining the modified signals with the primary reflections in time coincidence to produce a composite signal in which the multiple reflected energy is disproportionately diminished.

7. In seismic exploration, the method of removing multiples which comprises:

(a) successively generating seismic waves at each of a plurality of laterally spaced near-surface points located at different distances from a reference point, and (b) causing an automatically operable system to perform the steps of:

(i) generating electrical signals corrected for normal moveout and representative of seismic waves at points spaced at correspondingly different surface locations on the side of said reference location opposite the point of generation for the production of a plurality of signals including components reflected from a common depth point after traveling to and from said depth point along paths of different lengths, (ii) separately modifying each said electrical signal by applying time shifts and weights thereto in dependence upon variations in the average acoustic velocity along said paths as a function of depth, (iii) combining the filtered signals to form a composite signal, and (iv) registering said composite signal as a time function.

8. In seismic exploration, the method of removing multiples which comprises:

(a) successively generating seismic waves at each of a plurality of laterally spaced near-surface points located different distances from a reference point, and (b) causing an automatically operable system to perform the steps of:

(i) generating electrical signals corrected for normal moveout and representative of seismic waves at points spaced at correspondingly different surface locations on the side of said reference location opposite the point of generation for the production of a plurality of signals including components reflected from a common depth point after traveling to and from said depth point along paths of different lengths, (ii) separately modifying said electrical signals by applying time shifts and weights thereto in accordance with the operator $Y_j(f)$ and the relationship $$[S_{ij}*(f) + N_{ij}*(f)][Y_j(f)] = [S_{io}*(f)]$$

where
$i = 1, 2, 3 \ldots n$;
$j = 1, 2, 3 \ldots n$;
matrix elements $S_{ij}(f)$ and $N_{ij}(f)$ are the cross spectral densities between channels $i$ and $j$ for signal and noise, respectively; and elements $S_{io}(f)$ are the cross spectral densities between the desired output signal and the signal in channels $i = 1, 2 \ldots n$, respectively;

(iii) combining the filtered signals to form a composite signal, and (iv) registering said composite signal as a time function.

9. A method according to claim 8, including the step of changing the modification of said electrical signals as a function of time of said electrical signals.

10. In seismic exploration, the method of removing multiples which comprises:

(a) successively generating seismic waves at each of a plurality of laterally spaced near-surface points located at different distances from a reference point, and (b) causing an automatically operable system to perform the steps of:

(i) generating electrical signals representative of seismic waves at points spaced at correspondingly different surface locations on the side of said reference location opposite the point of generation for the production of a plurality of signals including components reflected from a common depth point after traveling to and from said depth point along paths of different lengths, (ii) separately filtering said signals in dependence upon variations in the multiple excess moveout times, (iii) combining the filtered signals to form a composite signal, and (iv) registering said composite signal as a time function.

11. A system for eliminating deep section multiples which comprises:

(a) means for successively generating seismic waves at a plurality of points spaced selected distances from a reference point, (b) means located at like distances from said reference point and on the side thereof opposite the respective generating means for detecting seismic waves, traveling to and from a common depth point, (c) a filter for each signal having a time-response characteristic dependent upon the velocity profiles along ray paths from said shot points to said detectors, and (d) compositing means interconnecting the outputs of said filters.

12. A system for eliminating deep section multiples which comprises:

(a) means for successively generating seismic waves at a plurality of points spaced selected distances from a reference point, (b) means located at like distances from said reference point and on the side thereof opposite the respective generating means for detecting seismic waves, and generating electrical signals representative thereof, (c) a filter connected to each said electrical signal and having a characteristic $Y_j(f)$ dependent upon the velocity profiles along ray paths from said shot points to said detectors as in the expression $$[S_{ij}*(f) + N_{ij}*(f)][Y_j(f)] = [S_{io}*(f)]$$

where:
$i = 1, 2, 3 \ldots n$;
$j = 1, 2, 3 \ldots n$;
matrix elements $S_{ij}(f)$ and $N_{ij}(f)$ are the cross spectral densities between channels $i$ and $j$ for signal and noise respectively; and
elements $S_{io}(f)$ are the cross spectral densities between the desired output signal and the signal in channels $i = 1, 2 \ldots n$, respectively; and (d) compositing means interconnecting the outputs of said filters.

References Cited

UNITED STATES PATENTS

| | | | |
|---|---|---|---|
| 2,732,906 | 1/1956 | Mayne | 340—15.5 |
| 3,105,568 | 10/1963 | Jolly | 340—15.5 |
| 3,131,375 | 4/1964 | Watson | 340—15.5 |
| 3,142,815 | 7/1964 | Picou | 340—15.5 |
| 3,274,541 | 9/1966 | Embree | 340—15.5 |
| 3,284,763 | 11/1966 | Burg et al. | 340—15.5 |
| 3,339,139 | 8/1967 | Lee et al. | 340—15.5 X |

RODNEY D. BENNETT, JR., Primary Examiner

D. C. KAUFMAN, Assistant Examiner